June 10, 1952     V. RAJTORA     2,599,779
ELECTRIC FURNACE
Original Filed March 9, 1949     2 SHEETS—SHEET 1
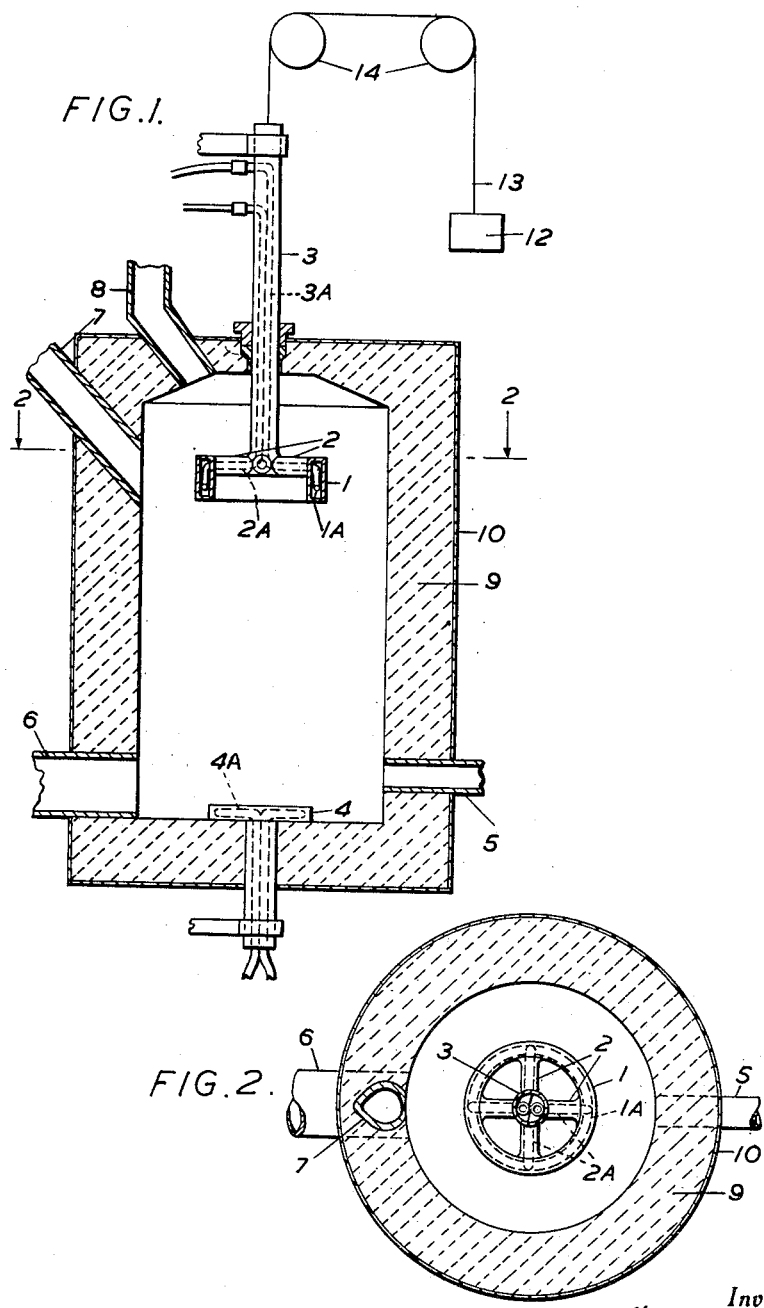
Inventor:
Vaclav Rajtora
By Richardson, David and Nordon
Attorneys

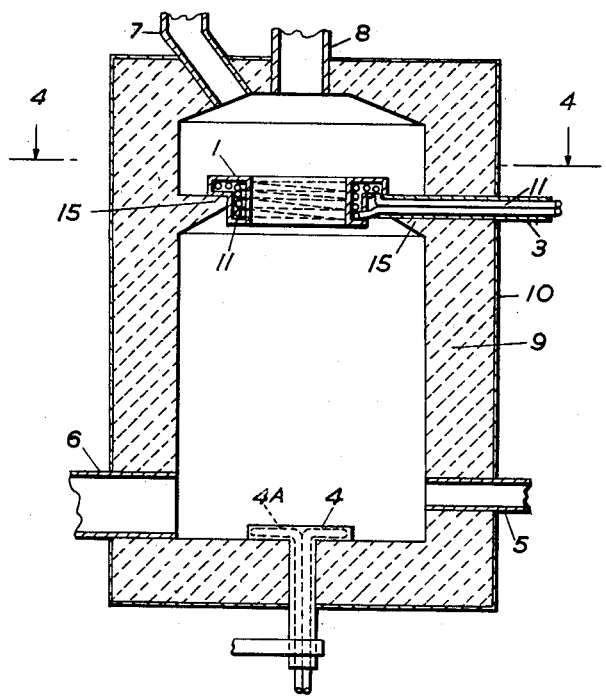
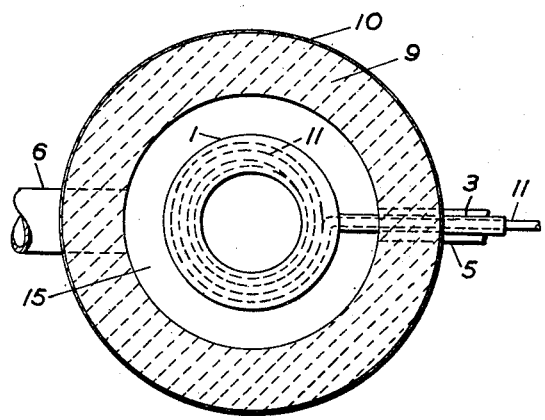

Patented June 10, 1952

2,599,779

UNITED STATES PATENT OFFICE 2,599,779

ELECTRIC FURNACE

Vaclav Rajtora, Paris, France

Original application March 9, 1949, Serial No. 80,364. Divided and this application December 28, 1949, Serial No. 135,485. In Switzerland January 26, 1949

3 Claims. (Cl. 13—23)

This invention relates to an electric furnace for heating gases and carrying out endothermic chemical reactions at high temperatures, particularly for the manufacture of water gas, synthesis gas, sulphur from sulphur dioxyde, carbon disulphide, carbide of calcium, for the reduction of ores, the coking of coal, or the smelting and distillation of metals.

In previously known electric furnaces which use the filling material itself as the heating resistance, wherever possible, the heat consuming processes are generally carried out at relatively high temperatures at which the charge can take part in a chemical reaction, or itself serves only as the heating resistance. Such furnaces have already been introduced in metallurgy, in the manufacture of carbide of calcium and carbide of silicon.

The main advantages of electrical heating, apart from the local conditions which may possibly give cheaper calory prices, are that the processes are not burdened by heating fuel such as coal, heating gases, air as, for example, in the ordinary blast furnace or in the manufacture of water gas. Other processes make poor use of the heat in worn-out retorts as, for example, in the manufacture of bisulphide, or chambers for coal coking.

The electric furnaces already known have, however, certain disadvantages which greatly limit their use. For example, the highest temperatures being at the electrodes themselves results in the chemical reactions taking place principally at the electrodes and the latter are thereby greatly affected. Also, the installation of the electrodes through furnace jackets and furnace covers has to be electrically insulated and gastight for the purpose of preventing the very undesirable loss of gases or, on the other hand, any intake of air.

In a furnace in accordance with the present invention deterioration of the electrodes is reduced to a minimum and this is attained by the fact that the electrodes, and particularly their surfaces which come into contact with the charge, are cooled by a built-in cooling system by means of a cooling medium, for example water or oil. The electrodes can thus be maintained safely at high temperatures without appreciably affecting the total efficiency of the furnace. The electrodes, therefore, seldom require replacement, and it is possible to enclose the current conductors through the furnace wall in an absolutely gastight manner. In further accordance with the invention, the furnace wall is protected from overheating, in that the contact surfaces of the electrodes are placed so far inside the furnace interior that very little current goes to the furnace wall. The electrodes may in many cases with advantage be covered with a protective compound.

Embodiments of the invention will now be described, by way of example, with reference to the accompanying drawing, in which:

Fig. 1 is a diagrammatic sectional elevation, of a furnace according to the invention, Fig. 2 is a sectional view on the line 2—2 of Fig. 1, Fig. 3 is a diagrammatic sectional elevation of an alternative embodiment, and Fig. 4 is a sectional view on the line 4—4 of Fig. 3.

The furnace shown in the drawing can either be used with a single phase alternating current or with direct current. Figs. 1 and 2 show an embodiment of a furnace according to the invention, in which the upper electrode is formed as a cylindrical ring 1. The ring 1 has cross bars 2, which are carried by a current lead-in 3. These parts 1, 2 and 3 are provided with built-in metal tubes 1A, 2A and 3A through which a cooling medium flows leading away undesired heat. The lower electrode consists of a metal plate 4, which is also artificially cooled, built-in metal tubes 4A being provided for the flow of the cooling medium. 5 is an opening through which gas to be heated or liquid to be evaporated can be introduced. 6 is an emptying opening and 7 is the outlet for the gaseous reduction products. The charge is fed in through an opening 8. The walls 9 are made of fire resistant ceramic material and are encased in a gastight iron casing 10.

In this example, the electrode 1 is so formed that it can be vertically adjusted together with the cross bars 2 and the lead-in 3, in order to regulate the resistance of the furnace. Conventional raising and lowering means are shown diagrammatically in Fig. 1, said means comprising a counter-weight 12 suspended by a cable 13 which is attached to the lead-in 3 and is led round pulleys 14. The electrode 1 can be raised or lowered by lowering or raising the counter-weight.

Figs. 3 and 4 show another embodiment of a furnace according to the invention. In this embodiment, the upper electrode is formed as a ring 1, which together with the current lead-in 3 is provided with built-in metal pipes 11 through which a cooling medium flows and leads away the undesired heat.

The electrode ring 1 is supported by a peripheral ledge 15 which projects inwards and reduces the cross-sectional area of the furnace thereat. The lower electrode is a metal plate 4, which is likewise also cooled, having built-in metal tubes 11A for the cooling medium. 5 is an opening through which the gas to be heated or liquid to be evaporated can be introduced. 6 is the emptying opening and 7 is the outlet for the gaseous reduction products. The charge is introduced through a central top opening 8. The walls 9 are made of fire resistant ceramic material and encased in a gastight casing 10.

I claim:

1. An electric furnace for heating gases and for carrying out endothermic chemical reactions in a solid electric-resistance type charge that is fed through the furnace, comprising a top wall, a side wall and a bottom wall, an electrode located in contact with the charge horizontally in the upper region of the furnace, being substantially inwardly spaced from and located centrally of said side wall and being spaced downwardly from the top of the furnace, said electrode comprising a hollow cylindrical ring having inner and outer walls, means extending from one wall of the furnace to support said ring, said means including conduits for the flow of cooling fluid between said inner and outer walls of said ring, and a continuous plate electrode located in contact with the charge horizontally and substantially centrally at the bottom wall of the furnace and spaced substantially inwardly from the side wall thereof, whereby electric current flows axially through the furnace and the chemical reaction takes place mainly around the centre thereof.

2. An electric furnace according to claim 1, in which the upper electrode is vertically adjustable and which has means for vertically adjusting said upper electrode.

3. An electric furnace according to claim 1, including means for supporting the upper electrode, said last mentioned means extending inwardly from said side wall.

VACLAV RAJTORA.

REFERENCES CITED

The following references are of record in the file of this patent:

UNITED STATES PATENTS

| Number | Name | Date |
|---|---|---|
| 1,056,045 | Murray | Mar. 18, 1913 |
| 1,130,940 | Summers | Mar. 9, 1915 |
| 1,177,680 | Brown | Apr. 4, 1916 |
| 1,203,276 | Scott | Oct. 31, 1916 |
| 1,680,630 | Okell | Aug. 14, 1928 |
| 2,215,982 | Slayter et al. | Sept. 24, 1940 |
| 2,244,267 | Slayter et al. | June 3, 1941 |
| 2,303,973 | Armstrong | Dec. 1, 1942 |

FOREIGN PATENTS

| Number | Country | Date |
|---|---|---|
| 26,360 | Norway | Oct. 25, 1915 |
| 405,361 | Great Britain | Feb. 8, 1934 |